(12) United States Patent
Nakajima et al.

(10) Patent No.: US 12,485,105 B2
(45) Date of Patent: Dec. 2, 2025

(54) COMPOSITION FOR SUPPRESSING OBESITY

(71) Applicants: DAICEL CORPORATION, Osaka (JP); NATIONAL UNIVERSITY CORPORATION KOBE UNIVERSITY, Kobe (JP); TOKUSHIMA UNIVERSITY, Tokushima (JP)

(72) Inventors: Takanori Nakajima, Tokyo (JP); Yoko Yamashita, Kobe (JP); Hitoshi Ashida, Kobe (JP); Rie Mukai, Tokushima (JP)

(73) Assignees: DAICEL CORPORATION, Osaka (JP); NATIONAL UNIVERSITY CORPORATION KOBE UNIVERSITY, Kobe (JP); TOKUSHIMA UNIVERSITY, Tokushima (JP)

( * ) Notice: Subject to any disclaimer, the term of this patent is extended or adjusted under 35 U.S.C. 154(b) by 668 days.

(21) Appl. No.: 17/757,610

(22) PCT Filed: Dec. 18, 2020

(86) PCT No.: PCT/JP2020/047516
§ 371 (c)(1),
(2) Date: Jun. 17, 2022

(87) PCT Pub. No.: WO2021/125342
PCT Pub. Date: Jun. 24, 2021

(65) Prior Publication Data
US 2023/0040395 A1 Feb. 9, 2023

(30) Foreign Application Priority Data
Dec. 20, 2019 (JP) .................. 2019-230188

(51) Int. Cl.
*A61K 31/352* (2006.01)
*A23L 2/52* (2006.01)
(Continued)

(52) U.S. Cl.
CPC .............. *A61K 31/352* (2013.01); *A23L 2/52* (2013.01); *A23L 33/10* (2016.08); *A61P 3/04* (2018.01); *A23V 2002/00* (2013.01)

(58) Field of Classification Search
CPC ....... A61K 31/352; A61K 31/353; A23L 2/52; A23L 33/10; A61P 3/04; A61P 3/06;
(Continued)

(56) References Cited

FOREIGN PATENT DOCUMENTS

EP      1 360 959 A1    11/2003
EP      2 737 897 A2    6/2014
(Continued)

OTHER PUBLICATIONS

Extended European Search Report for corresponding European Application No. 20903123.6, dated Nov. 16, 2023.
(Continued)

*Primary Examiner* — Taylor V Oh
(74) *Attorney, Agent, or Firm* — Birch, Stewart, Kolasch & Birch, LLP

(57) ABSTRACT

The present disclosure addresses the problem of providing at least a composition for suppressing obesity and the problem is solved by a composition for suppressing obesity comprising a prenylflavonoid represented by general formula (1), as an active ingredient, below.

9 Claims, 12 Drawing Sheets

(51) Int. Cl.
*A23L 33/10* (2016.01)
*A61P 3/04* (2006.01)

(58) Field of Classification Search
CPC .. A61P 3/10; A61P 21/00; A61P 43/00; A23V 2002/00; A23V 2200/316; A23V 2200/328; A23V 2200/332; A23V 2250/30
USPC ........................................................ 514/456
See application file for complete search history.

(56) References Cited

FOREIGN PATENT DOCUMENTS

| | | |
|---|---|---|
| EP | 3 560 352 A1 | 10/2019 |
| ES | 2 401 361 B1 | 1/2014 |
| JP | 2005-526122 A | 9/2005 |
| JP | 2009-518429 A | 5/2009 |
| JP | 2012-193157 A | 10/2012 |
| JP | 2016-136952 A | 8/2016 |
| WO | WO 2007-070355 A2 | 6/2007 |
| WO | WO 2018/150499 A1 | 8/2018 |

OTHER PUBLICATIONS

Chang et al., "Antiobesity effect of brewer's yeast biomass in animal model," Journal of Functional Foods (2019), vol. 55, pp. 255-262.

Costa et al., "Xanthohumol and 8-prenylnaringenin ameliorate diabetic-related metabolic dysfunctions in mice," Journal of Nutritional Biochemistry (2017), vol. 45, pp. 39-47.

International Search Report issued Feb. 9, 2021, in PCT/JP2020/047516.

Jo et al., "Benzylated and prenylated flavonoids from the root barks of *Cudrania tricuspidata* with pancreatic lipase inhibitory activity," Bioorganic & Medicinal Chemistry Letters (2015), vol. 25, pp. 3455-3457.

Kiyofuji et al., "Effects of Xanthohumol-Rich Hop Extract on the Differentiation of Preadipocytes," Journal of Oleo Science (2014), vol. 63, No. 6, pp. 593-597.

Milligan et al., "Identification of a potent phytoestrogen in hops (*Humulus lupulus* L.) and beer," The Journal of Clinical Endocrinology & Metabolism (1999) vol. 83, No. 6, ppp. 2249-2252.

Miyata et al., "Xanthohumol Improves Diet-induced Obesity and Fatty Liver by Suppressing Sterol Regulatory Element-binding Protein (SREBP) Activation, " The Journal of Biological Chemistry (2015), vol. 290, No. 33, pp. 20565-20579.

Mukai et al., "Prevention of Disuse Muscle Atrophy by Dietary Ingestion of 8-Prenylnaringenin in Denervated Mice," PLOS ONE (2012), vol. 7, Issue 9, e45048, pp. 1-11.

Written Opinion of the International Searching Authority mailed Feb. 9, 2021, in PCT/JP2020/047516.

Yui et al., "Effects of Xanthohumol-rich Extract from the Hop on Fatty Acid Metabolism in Rats Fed a High-fat Diet," Journal of Oleo Science (2014), vol. 63, No. 2, pp. 159-168.

Habtemariam, S., "The anti-obesity potential of sigmoidin A," Pharmaceutical Biology (2012), vol. 50, No. 12, pp. 1519-1522.

COMPOSITION FOR SUPPRESSING OBESITY

TECHNICAL FIELD

The present disclosure relates to a composition for suppressing obesity comprising a prenylflavonoid as an active ingredient.

BACKGROUND ART

Hops (*Humulus lupulus* L.) are dioecious vines that are perennial plants of the family Cannabaceae. The strobili of the female plants contain a raw material that imparts bitterness to beer, and further contain an active ingredient of prenylflavonoids such as isoxanthohumol and 8-prenylnaringenin. These prenylflavonoids have been reported to have various types of physiological activities and are attracting attention as pharmaceuticals and food materials.

For example, it has been reported that 8-prenylnaringenin exhibits physiological activities such as estrogen activity (Non-Patent Document 1), angiogenesis inhibition (Patent Document 1), and suppression of muscle disuse atrophy (Patent Document 2). In addition, xanthohumol has been reported to have an effect of suppressing obesity. Specifically, it has been reported that xanthohumol has an effect of suppressing the differentiation of 3T3-L1 cells and an effect of suppressing lipid synthesis (Non-Patent Document 2). Furthermore, it has been reported that weight gain is suppressed by administrating xanthohumol to rats (Non-Patent Document 3). It has also been reported that xanthohumol suppresses SREBP activation and lipid synthesis in rats (Non-Patent Document 4).

PRIOR ART DOCUMENTS

Patent Documents

[Patent Document 1] JP 2005-526122 T
[Patent Document 2] JP 2016-136952 A

Non-Patent Documents

[Non-Patent Document 1] J. Clin. Endocrinol. Metab., 83(6): 2249-52 (1999)
[Non-Patent Document 2] J. Oleo Sci., 63(6): 593-7 (2014)
[Non-Patent Document 3] J. Oleo Sci., 63(2): 159-68 (2014)
[Non-Patent Document 4] J. Biol. Chem., 14; 290(33): 20565-79 (2015)

SUMMARY OF THE INVENTION

Problems to be Solved by the Invention

An object of the present disclosure is at least to provide a composition for suppressing obesity.

Means for Solving the Problems (1) A composition for suppressing obesity comprising a prenylflavonoid represented by general formula (1) below, as an active ingredient:

[Chem. 1]

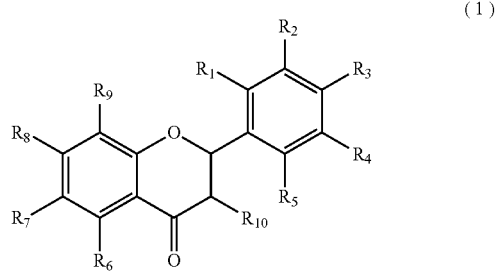

(1)

where $R_1$ to $R_9$ each independently represent a hydroxyl group, a hydrogen atom, or a prenyl group, $R_{10}$ represents a hydroxyl group or a hydrogen atom, and one or more of $R_1$ to $R_9$ are prenyl groups.

(2) The composition according to (1), wherein the prenylflavonoid is 8-prenylnaringenin.

(3) The composition according to (1) or (2), wherein the obesity suppression is a suppression of weight gain or a suppression of an increase in body fat.

(4) The composition according to any of (1) to (3), wherein the obesity suppression is a suppression of an increase in visceral fat or a suppression of an increase in subcutaneous fat.

(5) The composition according to any one of (1) to (4), wherein the obesity suppression is a suppression of an increase in visceral fat of the liver, the mesentery, the perinephrium or the epididymis.

(6) The composition according to any one of (1) to (5), wherein the composition is used for suppressing an increase in white fat.

(7) The composition according to any one of (1) to (6), wherein the composition is used for inhibiting the activity of pancreatic lipase.

(8) The composition according to any one of (1) to (7), wherein the composition is used for suppressing an increase in a concentration of glucose, cholesterol, or insulin in blood.

(9) The composition according to any of (1) to (8), wherein the composition is used for increasing muscle weight.

(10) The composition according to (9), wherein the muscle is a thigh muscle.

(11) The composition according to any of (1) to (10), wherein the composition is a pharmaceutical.

(12) The composition according to any of (1) to (10), wherein the composition is a food or beverage product.

Effect of the Invention

The present disclosure exhibits an effect of providing, at least, a technique for suppressing obesity.

MODE FOR CARRYING OUT THE INVENTION

Figure 1:
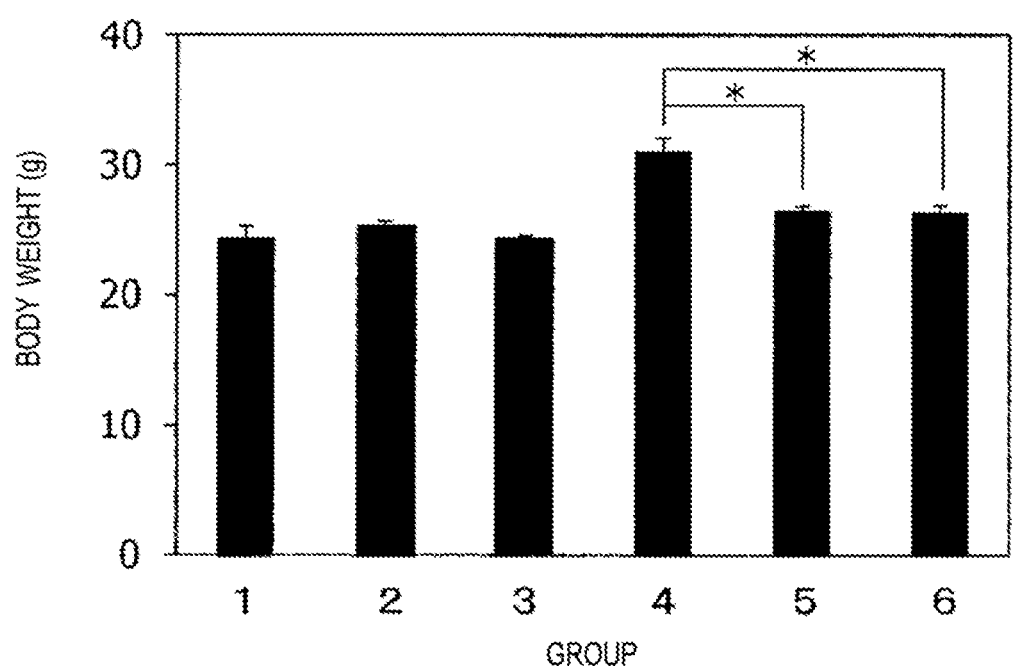
FIG. 1 is a graph showing the results of Example 1 as one embodiment.
Figure 2:
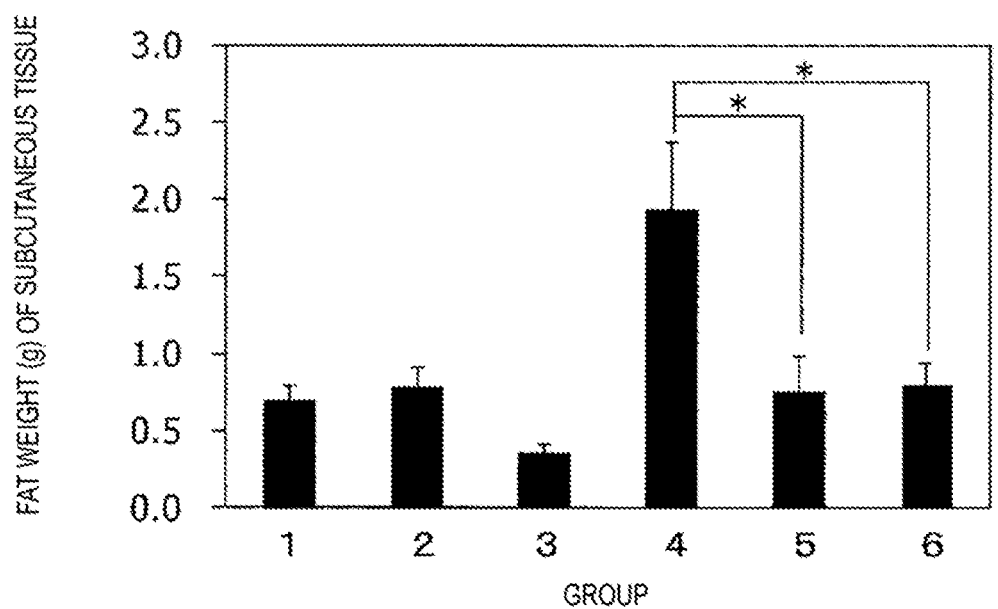
FIG. 2 is a graph showing the results of Example 1 as one embodiment.
Figure 3:
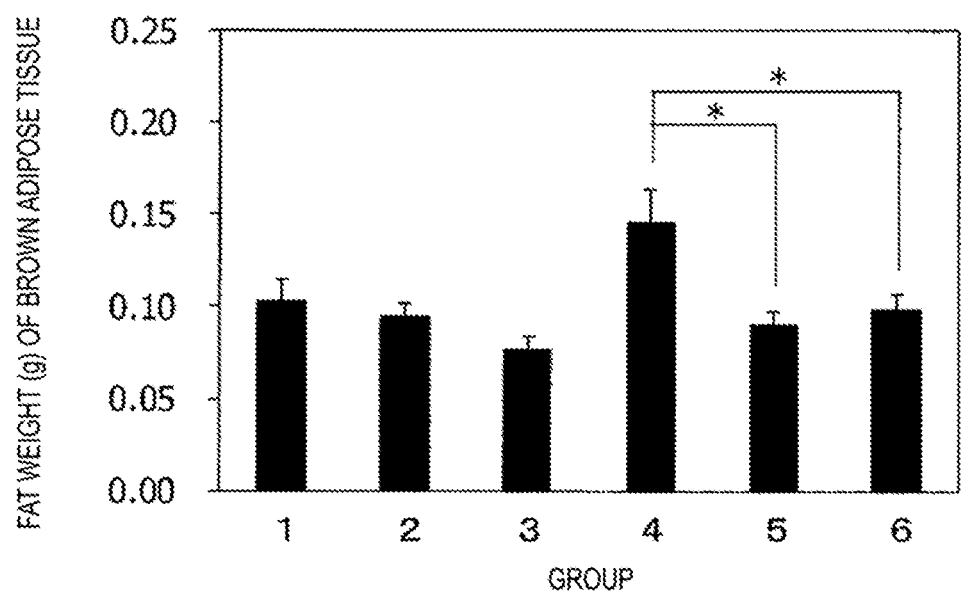
FIG. 3 is a graph showing the results of Example 1 as one embodiment.
Figure 4:
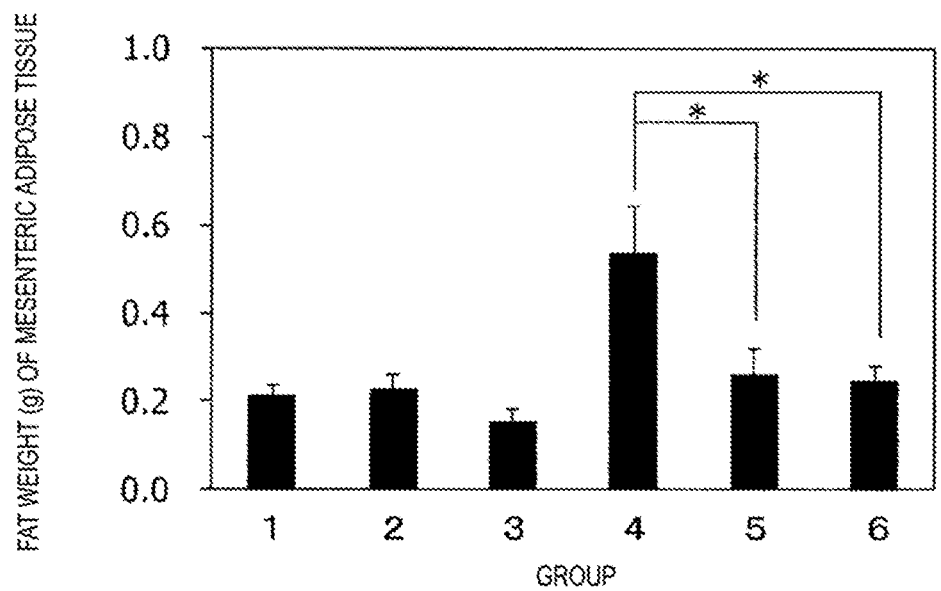
FIG. 4 is a graph showing the results of Example 1 as one embodiment.
Figure 5:
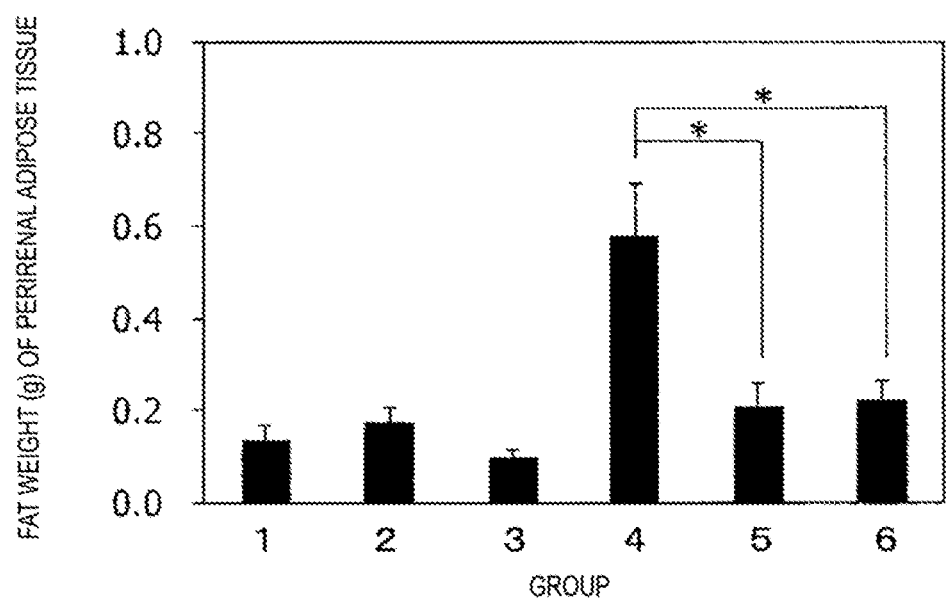
FIG. 5 is a graph showing the results of Example 1 as one embodiment.
Figure 6:
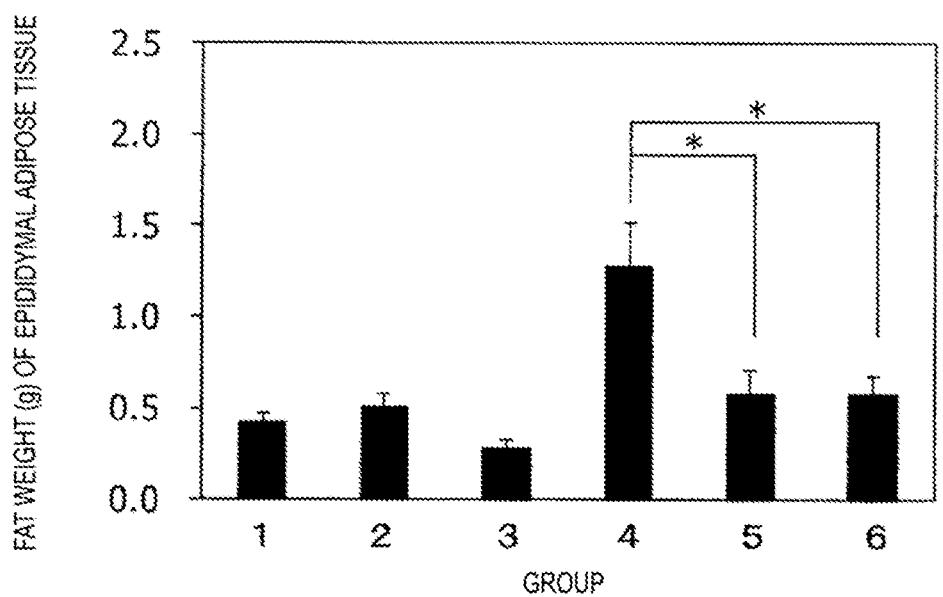
FIG. 6 is a graph showing the results of Example 1 as one embodiment.
Figure 7:
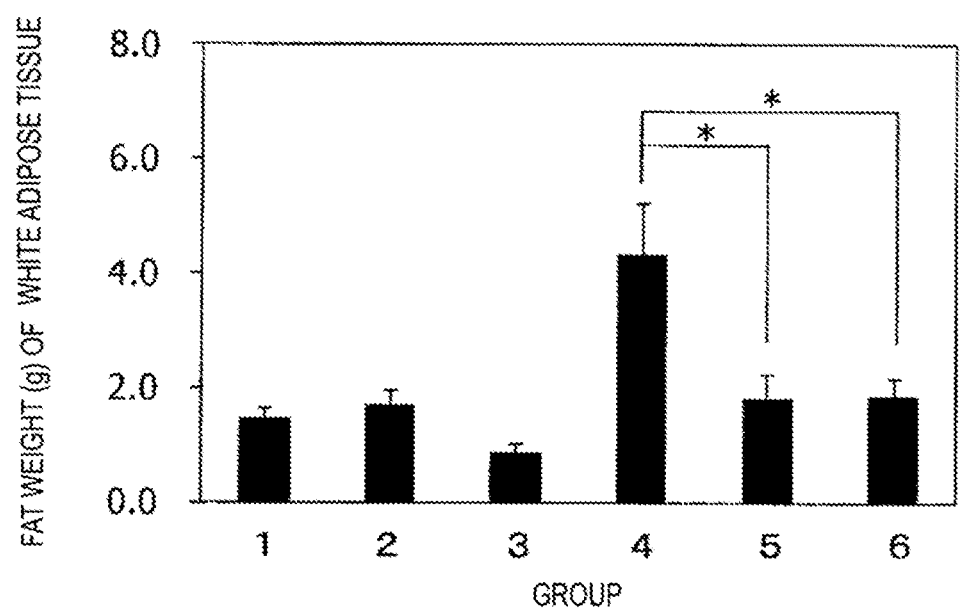
FIG. 7 is a graph showing the results of Example 1 as one embodiment.

One embodiment is an composition for suppressing obesity comprising a prenylflavonoid represented by general formula (1) below, as an active ingredient. Note that the prenylflavonoid may also be referred to as a "prenylated flavonoid".

[Chem. 2]

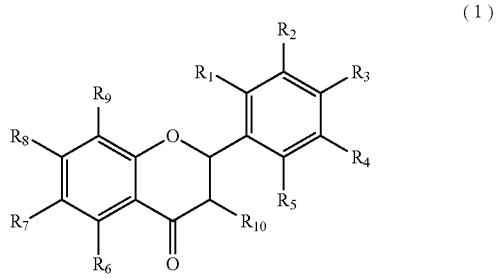

(1)

where $R_1$ to $R_9$ each independently represent a hydroxyl group, a hydrogen atom, or a prenyl group, $R_{10}$ represents a hydroxyl group or a hydrogen atom, and one or more of $R_1$ to $R_9$ are prenyl groups.

Hereinafter, the prenylflavonoid represented by general formula (1) above may be described as a "prenylflavonoid of the present embodiment". Additionally, the composition for suppressing obesity comprising a prenylflavonoid represented by general formula (1), as an active ingredient, may be described as a "composition of the present embodiment". The composition of the present embodiment may contain only the prenylflavonoid of the present embodiment, or may be a mixture with other components, and in this case, the components may be uniform or non-uniform.

Examples of a mammal that ingests the composition of the present embodiment or is administered the composition of the present embodiment include humans and mammals other than humans. Examples of mammals other than humans include rats, mice, dogs, cats, monkeys, pigs, and cows.

Examples of the prenylflavonoid of the present embodiment include flavonoids having a prenyl group, such as prenylnaringenins, isoxanthohumols, prenylquercetins, prenyleriodictyols, and prenylgenisteins.

The prenylflavonoid may have one or more prenyl group. Examples of the prenyl group include a dimethyl allyl group (5 carbons), a geranyl group (10 carbons), a farnesyl group (15 carbons), a geranylgeranyl group (20 carbons), a geranylfarnesyl group (25 carbons), a hexaprenyl group (30 carbons), an octaprenyl group (40 carbons), and a decaprenyl group (50 carbons).

Specific examples of the prenylnaringenins include 8-prenylnaringenin and 6-prenylnaringenin.

Examples of the prenylquercetins include 8-prenylquercetin, 6-prenylquercetin and 5'-prenylquercetin.

Examples of the prenyleriodictyols include nymphaeol A, nymphaeol B, nymphaeol C, and isonymphaeol C.

An example of the prenylgenisteins is 6-prenylgenistein.

Note that the xanthohumols do not have the structure represented by general formula (1) above.

The method for producing the prenylflavonoid of the present embodiment is not particularly limited, and a commercially available prenylflavonoid may be used, or the prenylflavonoid may be synthesized and produced through chemical synthesis, or may be produced by production by microorganism.

The produced prenylflavonoid of the present embodiment can be used as is, but may also be used after being dried and formed into a powder. Also, as necessary, the produced prenylflavonoid of the present embodiment may be subjected to purification and a concentrating treatment as necessary. As the purification treatment, treatments of filtration, adsorption using such as ion exchange resins or activated carbon columns, and bleaching can be performed. In addition, a known method such as use of an evaporator can be used as the concentrating treatment.

Furthermore, the produced prenylflavonoid of the present embodiment (or a purified product or concentrate thereof) may be formed into a powder in accordance with known methods such as a method in which the prenylflavonoid is subjected to a lyophilization process and then formed into a powder, or a method in which excipients such as dextrin, corn starch, and gum arabic are added, and the mixture is formed into a powder by spray drying. Subsequently, the powder may be dissolved, as necessary, in pure water, ethanol, or the like for use.

The content of the prenylflavonoid of the present embodiment with respect to the total amount of the composition of the present embodiment is not particularly limited as long as the action and effect of the prenylflavonoid of the present embodiment are exhibited. However, as a total amount of the prenylflavonoid of the present embodiment, in one preferable aspect of the present embodiment, the content is 0.00001 mass % or greater, in another preferable aspect, the content is 0.00005 mass % or greater, and in yet another preferable aspect, the content is 0.0001 mass % or greater, and furthermore, in one preferable aspect of the present embodiment, the content is 5 mass % or less, in another preferable aspect, the content is 0.5 mass % or less, and in yet another preferable aspect, the content is 0.05 mass % or less.

The effective ingestion amount or the effective dosage of the composition of the present embodiment is set, as appropriate, according to the subject's age, body weight, and disease, and the like, and according to the administration route, administration schedule, and formulation form, and the like, but the effective ingestion amount or the effective dosage are not particularly limited as long as the action and effect of the prenylflavonoid of the present embodiment is exhibited in a mammal by administering the composition of the present embodiment to the mammal or causing the mammal to ingest the composition of the present embodiment. The total amount of the prenylflavonoid of the present embodiment per day and per kilogram of body weight is 0.01 mg or greater in one preferable aspect of the present embodiment, is 0.05 mg or greater in another preferable aspect, and is 0.1 mg or greater in yet another preferable aspect, and is also 1000 mg or less in one preferable aspect of the present embodiment, is 100 mg or less in another preferable aspect, and is 10 mg or less in yet another preferable aspect.

In addition, the composition of the present embodiment may be ingested or administered once per day, or may be ingested or administered multiple times per day. The composition of the present embodiment may also be ingested or administered once every few days or few weeks.

In the present specification, "suppressing obesity" includes suppressing weight gain or suppressing an increase in body fat.

In the present specification, in a case where the action of suppressing obesity is an action of suppressing weight gain, when the prenylflavonoid of the present embodiment has been ingested by or administered to a mammal, the body weight of the mammal is reduced or is maintained in the equivalent state in comparison to when the prenylflavonoid is not ingested or administered. Body weight can be measured using a body weight scale, for example.

In the present specification, in a case where the action of suppressing obesity is an action of suppressing an increase in body fat, when the prenylflavonoid of the present embodiment has been ingested by or administered to a mammal, the body fat of the mammal is reduced or is maintained in the equivalent state in comparison to when the prenylflavonoid is not ingested or administered. The body fat can be measured, for example, by weighing adipose tissue extracted from the body, measuring the body fat percentage by the impedance method, and measuring the fat surface area after CT scan imaging.

Also, the body fat includes visceral fat or subcutaneous fat.

In addition to the measurement methods described above, the visceral fat can also be measured by, for example, extracting and weighing adipose tissue attached around each organ in the body, and measuring the total thereof. Also, in addition to the measurement methods described above, the subcutaneous fat can be measured by, for example, weighing adipose tissue extracted from subcutaneous tissue.

The visceral fat also includes visceral fat of the liver, the mesentery, the perinephrium or the epididymis.

Any of this visceral fat can also be measured, for example, by extracting and weighing adipose tissue deposited around these tissues, in addition to the measurement methods described above.

Furthermore, as is clear from the examples described below, the prenylflavonoid of the present embodiment can be used in the following applications. Furthermore, the composition of the present embodiment comprises the prenylflavonoid of the present embodiment as an active ingredient, and thus the composition of the present embodiment can also be used in the following applications.

The prenylflavonoid of the present embodiment has an effect of suppressing an increase in white fat, and thus can be used in applications of suppressing an increase in white fat.

From this, according to the present specification, a composition for suppressing an increase in white fat, the composition thereof comprising the prenylflavonoid of the present embodiment as an active ingredient, can be provided. In addition, according to the present specification, an composition for suppressing obesity comprising the prenylflavonoid of the present embodiment as an active ingredient and used for suppressing an increase in white fat can be provided.

The action of suppressing an increase in white fat is an action in which when the prenylflavonoid of the present embodiment has been ingested by or administered to a mammal, the white fat of the mammal is reduced or is maintained in an equivalent state in comparison to when the prenylflavonoid is not ingested or administered. White fat can be measured, for example, by weighing the white adipose tissue extracted from the body, measuring the white fat through the impedance method, and measuring the fat surface area after CT scan imaging.

Also, in an in vitro system, for example, a white adipocyte differentiation marker expressed in white adipocytes can be measured through western blotting. An example of white adipocytes is cells derived from mouse fibroblasts 3T3-L1.

Furthermore, the prenylflavonoid of the present embodiment has an effect of inhibiting the activity of pancreatic lipase, and thus can be used in applications for inhibiting the activity of pancreatic lipase. Note that mammalian pancreatic lipase is a digestive enzyme that is synthesized in the pancreas and secreted into the pancreatic juice to hydrolyze triacylglycerols.

From this, in the present specification, a composition that inhibits pancreatic lipase activity and comprises a prenylflavonoid of the present embodiment as an active ingredient can be provided. In addition, in the present specification, an composition for suppressing obesity comprising the prenylflavonoid of the present embodiment as an active ingredient and used for inhibiting the activity of pancreatic lipase can be provided.

The action of inhibiting pancreatic lipase activity is an action in which the activity of pancreatic lipase of a mammal is greatly inhibited when the prenylflavonoid of the present embodiment has been ingested by or administered to the mammal, in comparison to when the prenylflavonoid is not ingested or administered.

The extent of inhibition of pancreatic lipase activity can be evaluated in an in vitro system based on, for example, an activity inhibition rate. The activity inhibition rate can be calculated, for example, as in the examples described below. Also for example, it is sufficient to evaluate the action of inhibiting or suppressing the activity of an enzyme that has an action in hydrolyzing the ester bonds of the triacylglycerol to convert the triacylglycerol into a fatty acid and glycerin. Therefore, for example, the inhibition or suppressing action can be evaluated by using a fatty acid ester of 4-methylumbelliferone as a substrate, allowing lipase derived from a pig pancreas to act thereon, and then quantitatively determining the released 4-methylumbelliferone by a fluorescence measurement method.

Fat ingested in meals is converted into a fatty acid and glycerin through the action of this lipolytic enzyme pancreatic lipase, and then absorbed by the epithelial cells of the small intestine. When the activity of pancreatic lipase is inhibited, fat absorption in the intestinal tract is suppressed, and thus the prenylflavonoid of the present embodiment can be used in applications of suppressing fat absorption in the intestinal tract.

From this, according to the present specification, a composition that suppresses fat absorption in the intestinal tract and comprises the prenylflavonoid of the present embodiment as an active ingredient can be provided. In addition, according to the present specification, an composition for suppressing obesity used in suppressing fat absorption in the intestinal tract and comprising the prenylflavonoid of the present embodiment as an active ingredient can be provided.

Furthermore, the prenylflavonoid of the present embodiment has an action of suppressing an increase in the blood concentration of glucose, cholesterol, or insulin, and thus can be used in an application of suppressing an increase in the concentration of glucose, cholesterol, or insulin in blood.

From this, according to the present specification, a composition that suppresses an increase in the concentration of glucose, cholesterol, or insulin in blood and comprises a prenylflavonoid of the present embodiment as an active ingredient can be provided. Also, according to the present specification, an composition for suppressing obesity that is used for suppressing an increase in the concentration of glucose, cholesterol, or insulin in blood and comprises a prenylflavonoid of the present embodiment as an active ingredient can be provided.

The action of suppressing an increase in the concentration of glucose, cholesterol, or insulin in blood is an action in which, when the prenylflavonoid of the present embodiment is ingested by or administered to a mammal, the concentration of glucose, cholesterol, or insulin in blood in the mammal is reduced or is maintained in an equivalent state in comparison to when the prenylflavonoid is not ingested or administered.

Any of these concentrations in blood can be measured, for example, using a commercially available measurement kit.

Furthermore, the prenylflavonoid of the present embodiment has an action of increasing muscle weight, and thus can be used in an application to increase muscle weight.

From this, according to the present specification, a muscle weight-increasing composition that comprises the prenylflavonoid of the present embodiment as an active ingredient can be provided. In addition, according to the present specification, an composition for suppressing obesity that comprises the prenylflavonoid of the present embodiment as an active ingredient and is used for increasing muscle weight can be provided.

The action of increasing muscle weight is an action that results in the muscle weight of a mammal being larger when the mammal ingests or is administered the prenylflavonoid of the present embodiment in comparison to not ingesting or being administered the prenylflavonoid. The muscle weight can be measured, for example, through body component analysis measurements or a dual energy X-ray absorptiometry (DXA) method, or by extracting the muscle from the body, and then weighing and measuring the muscle with a scale or the like.

An example of the muscle is a thigh muscle.

The weight of the thigh muscle can be measured by a measurement method described above, or, for example, by extracting the thigh muscle from the body and weighing with a scale or the like.

Furthermore, the prenylflavonoid of the present embodiment has an action of promoting the discharge of body fat to outside of the body, and thus can be used in applications for promoting the discharge of body fat to outside of the body.

From this, according to the present specification, a composition that promotes the discharge of body fat to outside of the body and comprises the prenylflavonoid of the present embodiment as an active ingredient can be provided. In addition, according to the present specification, an composition for suppressing obesity that comprises the prenylflavonoid of the present embodiment as an active ingredient and is used for promoting the discharge of body fat to outside of the body can be provided.

The action of promoting the discharge of body fat to outside of the body is an action that results in a greater amount of body fat being discharged to outside of the body of a mammal when the mammal ingests or is administered the prenylflavonoid of the present embodiment in comparison to not ingesting or being administered the prenylflavonoid. The amount of body fat discharged outside of the body can be measured, for example, by using the Folch method to extract and weigh lipids excreted in the feces.

Furthermore, the prenylflavonoid of the present embodiment has an action of activating $\beta$-oxidation enzymes of fatty acids, and thus can be used in applications of activating the $\beta$-oxidization enzymes of fatty acids.

From this, according to the present specification, a composition that activates the $\beta$-oxidization enzymes of fatty acids and comprises the prenylflavonoid of the present embodiment as an active ingredient can be provided. In addition, according to the present specification, an composition for suppressing obesity that comprises the prenylflavonoid of the present embodiment as an active ingredient and is used for activating the $\beta$-oxidization enzymes of fatty acids can be provided.

The action of activating the $\beta$-oxidization enzymes of fatty acids is an action in which the activity of the $\beta$-oxidization enzymes of fatty acids is higher when a mammal ingests or is administered the prenylflavonoid of the present embodiment in comparison to when the prenylflavonoid is not ingested or administered. The activity of the $\beta$-oxidization enzymes of fatty acids can be measured, for example, by measuring the amount of mRNA of the $\beta$-oxidization enzymes and confirming the amount of gene expression.

Preferable embodiments of the composition of the present embodiment include a pharmaceutical agent, a food and beverage product (including a supplement), and a feed. That is, some preferable embodiments that can be provided by the present disclosure include a pharmaceutical agent for suppressing obesity comprising the prenylflavonoid of the present embodiment, a food and beverage product (including a supplement) for suppressing obesity comprising the prenylflavonoid of the present embodiment, and a feed for suppressing obesity comprising the prenylflavonoid of the present embodiment.

When the prenylflavonoid of the present embodiment is used as a material for a pharmaceutical agent, the method for application as a pharmaceutical agent can be either oral administration or parenteral administration. When the prenylflavonoid of the present embodiment is to be administered, the active ingredient can be mixed with a solid or liquid non-toxic pharmaceutical carrier suitable for an administration method such as oral administration, rectal administration, or injection, and then administered in a typical form of a pharmaceutical formulation. Such formulations include, for example, a solid agent such as tablets, granules, powders, and capsules; a liquid agent such as solutions, suspensions, and emulsions; and a lyophilized formulation, and these formulations can be prepared by commonly used means for preparing formulations. Examples of the non-toxic pharmaceutical carrier described above include glucose, lactose, sucrose, starch, mannitol, dextrin, fatty acid glyceride, polyethylene glycol, hydroxyethyl starch, ethylene glycol, polyoxyethylene sorbitan fatty acid esters, amino acids, gelatin, albumin, water, and physiological saline. Also, as necessary, commonly used additives such as stabilizers, wetting agents, emulsifiers, binders, and isotonizing agents can be added as appropriate.

The pharmaceutical agents can be used for the prevention or amelioration of diseases, disorders, symptoms, and syndromes (herein, may be described as "diseases and the like") that can be prevented or ameliorated by the prenylflavonoid of the present invention. "Amelioration" includes "treatment". When the mammal is a human, examples of the diseases and the like include those given as examples of diseases related to excess weight by the Japan Obesity Prevention Association, such as obesity, diabetes, abnormal glucose metabolism kidney disease, hypertension, myocardial infarctions, angina (coronary artery disease), strokes, gout, hyperuricemia, dyslipidemia, fatty liver disease, sleep apnea syndrome, obesity hypoventilation syndrome, orthopedic diseases (lumbar spondylosis, osteoarthritis of the knee, bone spur formation, and the like), menstrual abnormalities, pregnancy complications (preeclampsia, gestational diabetes, and the like), and other diseases associated with any of these diseases.

The content of the prenylflavonoid of the present embodiment with respect to the total amount of the pharmaceutical agent is not particularly limited as long as the action and effect of the prenylflavonoid of the present embodiment are exhibited. However, as a total amount of the prenylflavonoid of the present embodiment, in one preferable aspect, the content is 0.00001 mass % or greater, in another preferable aspect, the content is 0.00005 mass % or greater, and in yet another preferable aspect, the content is 0.0001 mass % or greater, and furthermore, in one preferable aspect, the content is 5 mass % or less, in another preferable aspect, the content is 0.5 mass % or less, and in yet another preferable aspect, the content is 0.05 mass % or less.

The effective dosage of the pharmaceutical agent is set, as appropriate, according to the subject's age, body weight, and disease, and the like, and according to the administration route, administration schedule, and formulation form, and the like, but the effective dosage is not particularly limited as long as the action and effect of the prenylflavonoid of the present embodiment is exhibited in a mammal by administering the pharmaceutical of the present embodiment to the mammal. The total amount of the prenylflavonoid of the present embodiment per day and per kilogram of body weight is 0.01 mg or greater in one preferable aspect, is 0.05 mg or greater in another preferable aspect, and is 0.1 mg or greater in yet another preferable aspect, and is also 1000 mg or less in one preferable aspect, is 100 mg or less in another preferable aspect, and is 10 mg or less in yet another preferable aspect.

Furthermore, the pharmaceutical agent may be administered once per day, or may be administered multiple times per day. The pharmaceutical agent may also be administered once every few days or few weeks.

When the prenylflavonoid of the present embodiment is used as a material for food or beverage products, in addition to general food and beverage products, the prenylflavonoid of the present embodiment can also be used as, for example, a food for specified health uses, a dietary supplement, a functional food, a food for a sick person, and a food additive (beverages are also included in these). The form of the food or beverage product may not be necessarily a form of the plant or animal itself containing the prenylflavonoid of the present embodiment. For example, the food or beverage product may be prepared by adding an appropriate auxiliary agent to the prenylflavonoid of the present embodiment, followed by, using a commonly used means, shaping into a form for consumption such as granules, particles, tablets, capsules, or a paste, and thus supplied for use as food. Alternatively, the food or beverage product may be prepared by adding the prenylflavonoid of the present embodiment to various food products such as, for example, processed meats such as ham and sausage; processed seafoods such as tube-shaped fish paste cake (kamaboko) and steamed seasoned fish paste (chikuwa); and breads, confectioneries, butter, powdered milk, and fermented milk products and then used, and may be added to a beverage such as water, fruit juice, milk, or soft drinks and then used.

The food or beverage product can contain, as main ingredients, water, proteins, carbohydrates, lipids, vitamins, minerals, organic acids, organic bases, fruit juices, flavors, and the like. Examples of the proteins include animal and vegetable proteins such as powdered whole milk, powdered skim milk, powdered partially skim milk, casein, soy protein, chicken egg protein, meat protein, hydrolysates thereof and butter. Examples of the carbohydrates include sugars, processed starches (dextrin, as well as soluble starches, British starch, oxidized starch, starch esters, starch ethers, and the like), and dietary fiber. Examples of the lipids include lard, safflower oil, corn oil, rapeseed oil, coconut oil, fractionated oils thereof, hydrogenated oils thereof, transesterified oils, and other such vegetable oils and fats. Examples of vitamins include vitamin A, carotenes, vitamin B group vitamins, vitamin C, vitamin D group vitamins, vitamin E, vitamin K group vitamins, vitamin P, vitamin Q, niacin, nicotinic acid, pantothenic acid, biotin, inositol, choline, and folic acid, and examples of minerals include calcium, potassium, magnesium, sodium, copper, iron, manganese, zinc, selenium, and whey minerals. Examples of organic acids include malic acid, citric acid, lactic acid, and tartaric acid. Two or more types of these components may be used in combination, and synthetic products and/or food and beverage products containing large amounts of these may be used.

The food and beverage products can be produced, for example, by a commonly used method. Furthermore, the blended amount of the prenylflavonoid of the present embodiment into a food or beverage product, the blending method, and the blending time can be selected as appropriate. Furthermore, if necessary, the obtained food or beverage product can be sealed in an appropriate container such as a bottle, a bag, a can, a box, or a pack.

The content of the prenylflavonoid of the present embodiment with respect to the total amount of the food or beverage product is not particularly limited as long as the action and effect of the prenylflavonoid of the present embodiment are exhibited. However, as a total amount of the prenylflavonoid of the present embodiment, in one preferable aspect, the content is 0.00001 mass % or greater, in another preferable aspect, the content is 0.00005 mass % or greater, and in yet another preferable aspect, the content is 0.0001 mass % or greater, and furthermore, in one preferable aspect, the content is 5 mass % or less, in another preferable aspect, the content is 0.5 mass % or less, and in yet another preferable aspect, the content is 0.05 mass % or less.

The effective ingestion amount of the food or beverage product is set, as appropriate, according to the subject's age and body weight, and according to the ingestion route, the ingestion schedule, and the form, and the like, but the effective ingestion amount is not particularly limited as long as the action and effect of the prenylflavonoid of the present embodiment is exhibited in a mammal through the ingestion of the food or beverage product of the present embodiment by the mammal. The total amount of the prenylflavonoid of the present embodiment per day and per kilogram of body weight is 0.01 mg or greater in one preferable aspect, is 0.05 mg or greater in another preferable aspect, and is 0.1 mg or greater in yet another preferable aspect, and is also 1000 mg or less in one preferable aspect, is 100 mg or less in another preferable aspect, and is 10 mg or less in yet another preferable aspect.

Furthermore, the food or beverage product may be ingested once per day, or may be ingested multiple times per day. The food or beverage product may also be ingested once every few days or few weeks.

When the mammal is a mammal other than a human, the prenylflavonoid of the present embodiment can be used as a material for the feed. In this case, the feed raw material and the prenylflavonoid of the present embodiment may be appropriately blended according to the type of mammal and the rearing environment such as the development stage and area.

Examples of feed raw materials include grains or processed grains (such as corn, milo, and barley), bran (such as wheat bran, rice bran, and corn gluten feed), vegetable oil residue cakes (such as soybean oil residue cake, sesame oil residue cake, and cottonseed oil residue cake), animal raw materials (such as powdered skim milk, fish meal, and meat-and-bone meal), minerals (such as calcium carbonate, calcium phosphate, salt, and silicic anhydride), vitamins, amino acids, yeasts such as beer yeast, and fine powders of inorganic substances (such as crystalline cellulose, talc, and silica).

The raw material of the feed may contain feed additives that are normally used in compounded feeds, such as excipients, bulking agents, binders, thickening agents, emulsifiers, coloring agents, flavorings, food additives, and seasonings, as well as other components (such as antibiotics, bactericides, insecticides, and preservatives) as desired.

The form of the feed described above is not particularly limited, and for example, the feed may be in the form of a powder, granules, paste, pellets, capsules (hard capsules, soft capsules), or tablets, and the feed may be used as feed for pet food for pets or as feed for laboratory animals.

The content of the prenylflavonoid of the present embodiment with respect to the total amount of the feed is not particularly limited as long as the action and effect of the prenylflavonoid of the present embodiment are exhibited. However, as a total amount of the prenylflavonoid of the present embodiment, in one preferable aspect, the content is 0.00001 mass % or greater, in another preferable aspect, the content is 0.00005 mass % or greater, and in yet another preferable aspect, the content is 0.0001 mass % or greater, and furthermore, in one preferable aspect, the content is 5 mass % or less, in another preferable aspect, the content is 0.5 mass % or less, and in yet another preferable aspect, the content is 0.05 mass % or less.

The effective dosage of the feed is set, as appropriate, according to the subject's age and body weight, and according to the administration route, administration schedule, and formulation form, and the like, but the effective dosage is not particularly limited as long as the action and effect of the prenylflavonoid of the present embodiment is exhibited in a mammal by administering the feed of the present embodiment to the mammal. The total amount of the prenylflavonoid of the present embodiment per day and per kilogram of body weight is 0.01 mg or greater in one preferable aspect, is 0.05 mg or greater in another preferable aspect, and is 0.1 mg or greater in yet another preferable aspect, and is also 1000 mg or less in one preferable aspect, is 100 mg or less in another preferable aspect, and is 10 mg or less in yet another preferable aspect.

Furthermore, the feed may be administered once per day, or may be administered multiple times per day. The feed may also be administered once every few days or few weeks.

The present specification can also provide the following embodiments. The content described above is cited as the details of the following embodiments.

Use of a prenylflavonoid of the present embodiment for producing an composition for suppressing obesity.

The prenylflavonoid of the present embodiment for use in the prevention or amelioration of diseases and the like that can be prevented or ameliorated by the prenylflavonoid of the present embodiment.

Use of the prenylflavonoid of the present embodiment for suppressing obesity.

A method for preventing or ameliorating diseases and the like that can be prevented or ameliorated by the prenylflavonoid of the present embodiment, the method comprising administering the prenylflavonoid of the present embodiment at an effective amount for prevention or amelioration to a mammal requiring prevention or amelioration.

EXAMPLES

Examples are described below, but none of the examples are interpreted to be limiting.

Example 1

C57BL/6 male mice (available from Japan SLC, Inc.) were arranged into the following six groups of six mice each. Note that, 8-prenylnaringenin (may be described herein as 8PN) was used as the prenylflavonoid of the present embodiment.

(Group 1) Group that ingested a normal diet without the addition of 8PN
(Group 2) Group that ingested a normal diet with the addition of 8PN (final concentration: 0.0005%)
(Group 3) Group that ingested a normal diet with the addition of 8PN (final concentration: 0.005%)
(Group 4) Group that ingested a high-fat diet without the addition of 8PN
(Group 5) Group that ingested a high-fat diet with the addition of 8PN (final concentration: 0.0005%)
(Group 6) Group that ingested a high-fat diet with the addition of 8PN addition (final concentration: 0.005%)

AIN-93M feed was used as the normal diet (control diet), and AIN-93M feed containing 30% lard was used as the high-fat diet. These feeds were mixed with 8PN for Group 2, Group 3, Group 5 and Group 6.

The mice were each raised in individual cages, were allowed to freely consume each feed and deionized water, and were raised for 8 weeks. The rearing environment included a temperature of 22±2° C., humidity without artificial control, and light-dark cycles alternated every 12 hours. After 8 weeks, the mice were slaughtered by drawing blood from the heart under co-anesthesia of sevoflurane and somnopentyl, after which each mouse was weighed to measure the body weight. Next, subcutaneous adipose tissue, brown adipose tissue, mesenteric adipose tissue, perirenal adipose tissue, and epididymal adipose tissue were extracted from each mouse, and the fat weight in each tissue was measured by weighing with a scale. The total weight of adipose tissue other than the brown adipose tissue was calculated as the weight of white adipose tissue from the extracted fat.

The results were graphed in FIGS. 1 to 7, which show the body weight at the end of the experiment, the fat weight of the subcutaneous adipose tissue, the fat weight of the brown adipose tissue, the fat weight of the mesenteric adipose tissue, the fat weight of the perirenal adipose tissue, the fat weight of the epididymal adipose tissue, and the fat weight of the white adipose tissue, respectively.

An increase in body weight, an increase in the fat weight of the subcutaneous adipose tissue, an increase in the fat weight of the brown adipose tissue, an increase in the fat weight of the mesenteric adipose tissue, an increase in the fat weight of the perirenal adipose tissue, an increase in the fat weight of the epididymal adipose tissue, and an increase in the fat weight of the white adipose tissue were all suppressed in Group 5 and Group 6 in a comparison with Group 4 (in the graphs, * indicates p<0.05).

Example 2

Example 2 was carried out in the same manner as Example 1 up to the slaughtering of the mice. Blood was drawn from each mouse at the time of slaughtering and was centrifuged at 5000 rpm for 10 minutes, and plasma was obtained from the supernatant. The amount of glucose was measured using the Glucose CII Test Wako Kit (available from Fujifilm Wako Pure Chemical Corporation), and the amount of insulin was measured using the LBIS (trade name) Mouse Insulin ELISA Kit (RTU) (available from Fujifilm Wako Pure Chemical Corporation). In addition, the amount of cholesterol was measured using the LabAssay Cholesterol Kit (available from Fujifilm Wako Pure Chemical Corporation).

Figure 8:
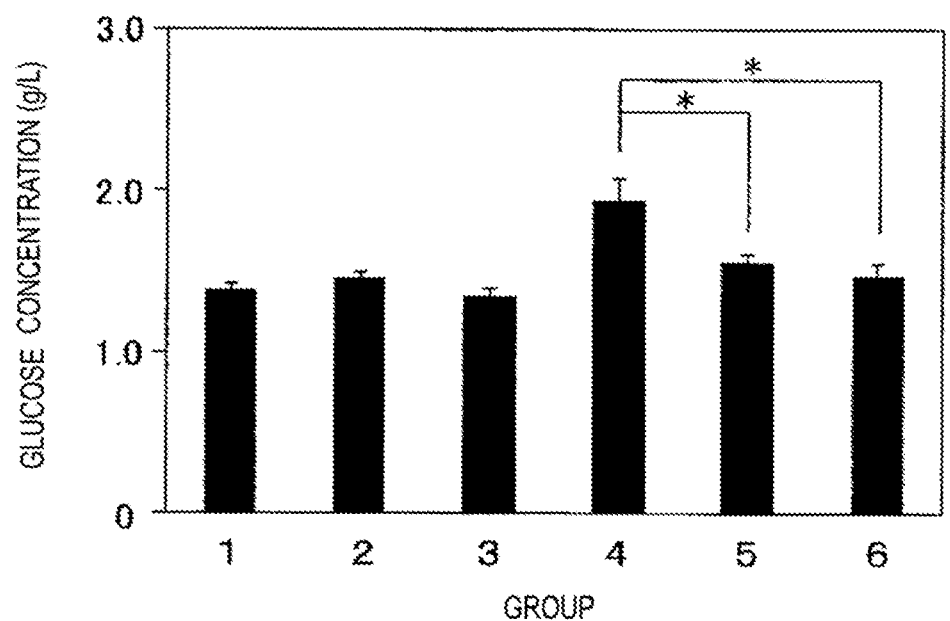
FIG. 8 is a graph showing the results of Example 2 as one embodiment.
Figure 9:
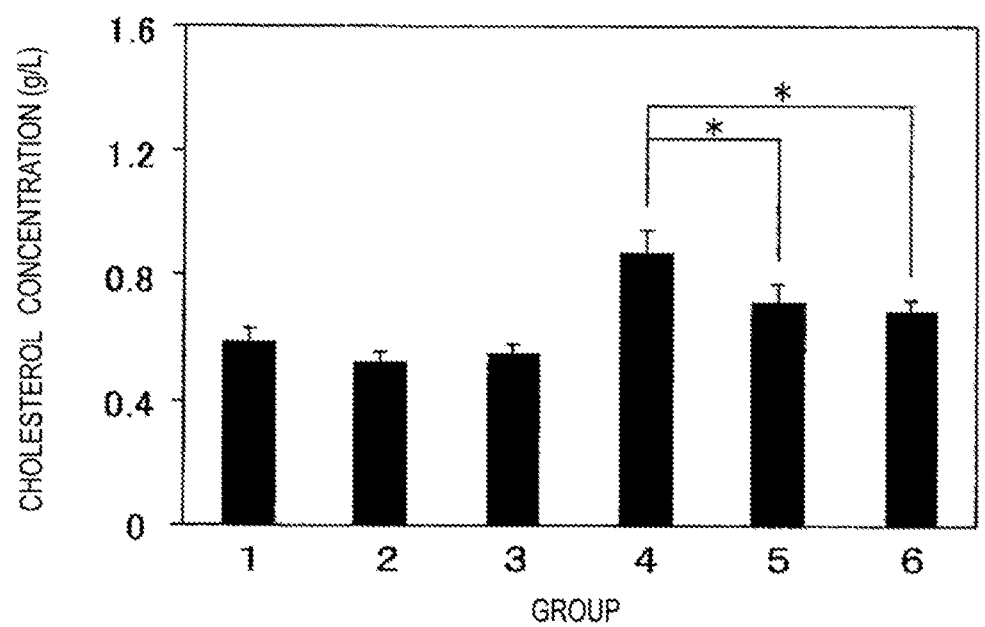
FIG. 9 is a graph showing the results of Example 2 as one embodiment.
Figure 10:
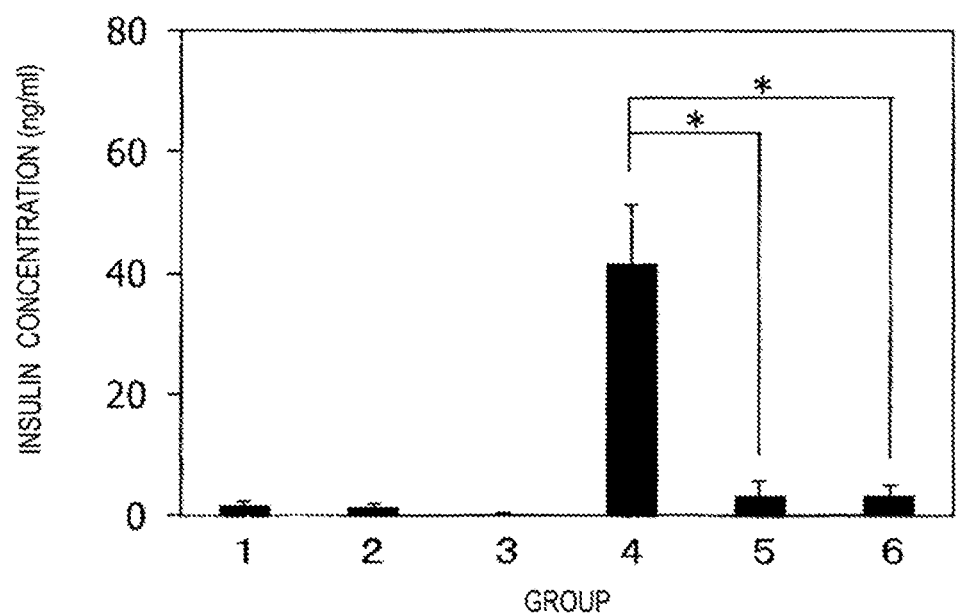
FIG. 10 is a graph showing the results of Example 2 as one embodiment.

As the results, the amounts of glucose, cholesterol and insulin were shown in FIGS. 8 to 10, respectively.

In Groups 5 and 6, increases in the blood concentrations of glucose, cholesterol and insulin were suppressed in comparison to Group 4.

Example 3

Example 3 was implemented in the same manner as Example 1 up to the slaughtering of the mice. At the time of the slaughtering, the thigh muscles were removed from each mouse, and the weight of each muscle was measured by weighing with a scale.

Figure 11:
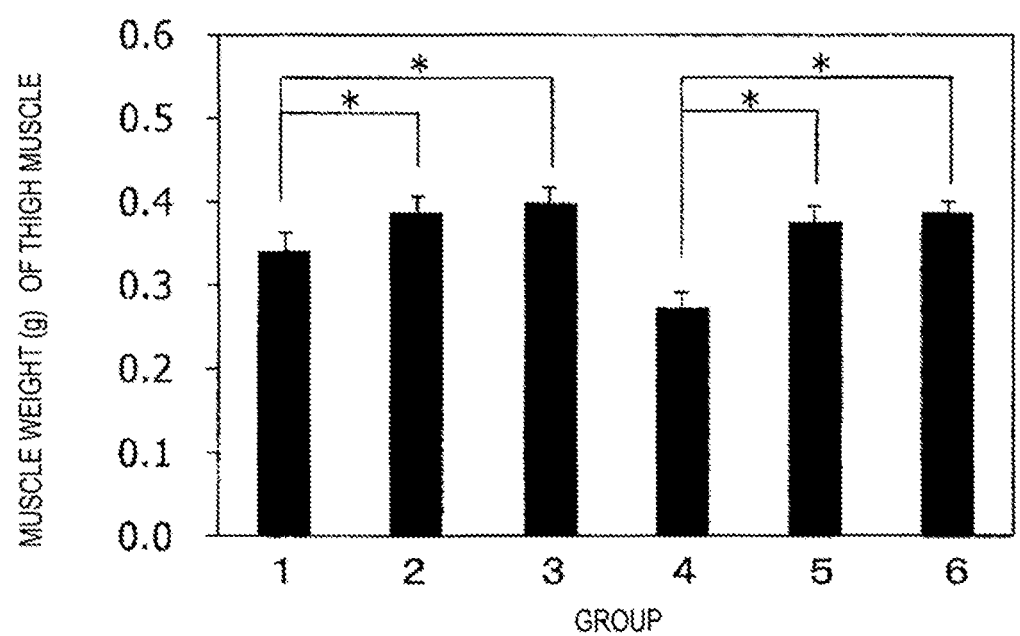
FIG. 11 is a graph showing the results of Example 3 as one embodiment.

As the results, the weights of the thigh muscles were shown in FIG. 11.

In Groups 5 and 6, the weight of the thigh muscle increased in comparison to Group 4 (in the graph, * indicates p<0.05). Note that in Groups 2 and 3, which consumed a normal diet, the weight of the thigh muscle also increased in comparison to Group 1 (in the graph, * indicates p<0.05).

Example 4

An enzyme solution was prepared by dissolving pig-derived pancreatic lipase II (available from Sigma) in a 100 mM Tris-HCl buffer solution (pH 7.0) to make a final concentration of 250 µg/mL. In addition, 80 mg of triolein, 10 mg of lecithin, and 5 mg of sodium cholate were dissolved in 9 mL of a 100 mM tris-HCl buffer solution (pH 7.0), and the mixture was subjected to ultrasonic treatment for 10 minutes to prepare a substrate solution that was a homogeneous suspension. A total amount of 0.1 mL of a test reaction solution was prepared from 0.04 mL of the substrate solution, 0.04 mL of an 8PN solution (final concentration: 1.0 mg/mL, 2.0 mg/mL, 4.0 mg/mL, 7.0 mg/mL or 10.0 mg/mL), and 0.02 mL of the enzyme solution, and an enzyme reaction was carried out at 37° C. for 30 minutes. The reaction was stopped by a heating treatment at 100° C. for 2 minutes, and the amount of free fatty acids was measured through absorbance at a wavelength of 550 nm using the NEFA C-Test Wako Kit (available from Fujifilm Wako Pure Chemical Corporation). Note that lipase activity became greater as the amount of free fatty acids increased.

Also note that a control was prepared in the same manner as described above with the exception that DMSO was used instead of 8PN. In addition, a blank was prepared in the same manner as described above with the exception that an enzyme solution was not added. The lipase activity inhibition rate was calculated by the following calculation equation (1).

$$\text{Lipase activity inhibition rate (\%)} = \{1 - ((B-A)/(C-A))\} \times 100 \quad (1)$$

Figure 12:
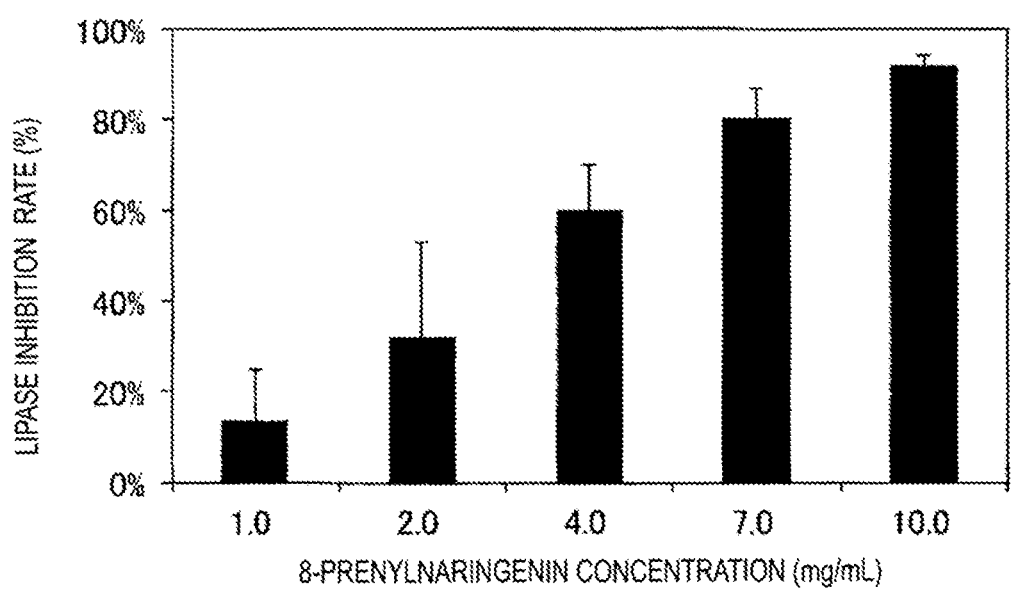
FIG. 12 is a graph showing the results of Example 4 as one embodiment.

A: Absorbance of blank
B: Absorbance of test reaction solution
C: Absorbance of control As results, FIG. 12 shows the relationship between the concentration of 8PN and the lipase activity inhibition rate. The lipase activity inhibition rate increased in a manner dependent on the concentration of 8PN.

The invention claimed is:

1. A method for suppressing obesity in a subject in need of said suppressing, comprising administering a composition comprising 8-prenylnaringenin as the sole active ingredient, in an effective amount for suppressing obesity to said subject.

2. The method according to claim 1, wherein the composition is a pharmaceutical.

3. The method according to claim 1, wherein the composition is a food or beverage product.

4. A method for suppressing weight gain in a subject in need of said suppressing, comprising administering a composition comprising 8-prenylnaringenin as the sole active ingredient, in an effective amount for suppressing weight gain to said subject.

5. The method according to claim 4, wherein the composition is a pharmaceutical.

6. The method according to claim 4, wherein the composition is a food or beverage product.

7. A method for suppressing an increase in body fat in a subject in need of said suppressing, comprising administering a composition comprising 8-prenylnaringenin as the sole active ingredient, in an effective amount for suppressing an increase in body fat to said subject.

8. The method according to claim 7, wherein the composition is a pharmaceutical.

9. The method according to claim 7, wherein the composition is a food or beverage product.

* * * * *